United States Patent
Shiraishi et al.

(10) Patent No.: US 8,078,008 B2
(45) Date of Patent: Dec. 13, 2011

(54) DEVICE, METHOD AND PROGRAM FOR PROCESSING IMAGE

(75) Inventors: Shinichi Shiraishi, Kanaguchi (JP); Akemi Ito, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 1002 days.

(21) Appl. No.: 12/015,357

(22) Filed: Jan. 16, 2008

(65) Prior Publication Data
US 2008/0175435 A1 Jul. 24, 2008

(30) Foreign Application Priority Data
Jan. 16, 2007 (JP) ................................ 2007-006725

(51) Int. Cl.
*G06K 9/32* (2006.01)
(52) U.S. Cl. ........ 382/299; 382/284; 382/294; 358/540; 358/450
(58) Field of Classification Search .................. 382/282, 382/284, 294; 358/538, 540, 450
See application file for complete search history.

(56) References Cited

U.S. PATENT DOCUMENTS

| | | | | |
|---|---|---|---|---|
| 5,576,950 A * | 11/1996 | Tonomura et al. | ............ | 386/200 |
| 6,434,276 B2 * | 8/2002 | Hirosawa et al. | ............. | 382/284 |
| 6,640,002 B1 * | 10/2003 | Kawada | ......................... | 382/141 |
| 6,874,420 B2 * | 4/2005 | Lewis et al. | .................... | 101/485 |
| 6,934,011 B2 * | 8/2005 | Geh et al. | .......................... | 355/77 |
| 7,027,054 B1 * | 4/2006 | Cheiky et al. | .................. | 345/473 |
| 7,133,080 B2 * | 11/2006 | Kobayashi et al. | ............ | 348/663 |
| 7,595,825 B2 * | 9/2009 | Tsuruoka | ...................... | 348/241 |

FOREIGN PATENT DOCUMENTS

| | | |
|---|---|---|
| JP | 2000-244851 | 9/2000 |
| JP | 2005197910 A | 7/2005 |
| JP | 2006033141 A | 2/2006 |

* cited by examiner

*Primary Examiner* — Yosef Kassa
(74) *Attorney, Agent, or Firm* — DLA Piper LLP (US)

(57) ABSTRACT

Disclosed herein is a device for processing a moving image, the device including: a selection unit which selects an image group composed of a plurality of still images including a target image from the moving image, according to specified information for specifying the target image among the plurality of still images included in the moving image; an acquisition unit which performs an acquisition process of acquiring the plurality of still images included in the image group from the moving image; and a synthesis unit which performs a synthesis process of synthesizing the plurality of acquired still images and generating a high-resolution image of the target image having a pixel density higher than that of the target image, wherein the selection unit has a function for performing selection by a first mode for selecting the target image and a still image which is located behind the target image in time-series order.

4 Claims, 6 Drawing Sheets

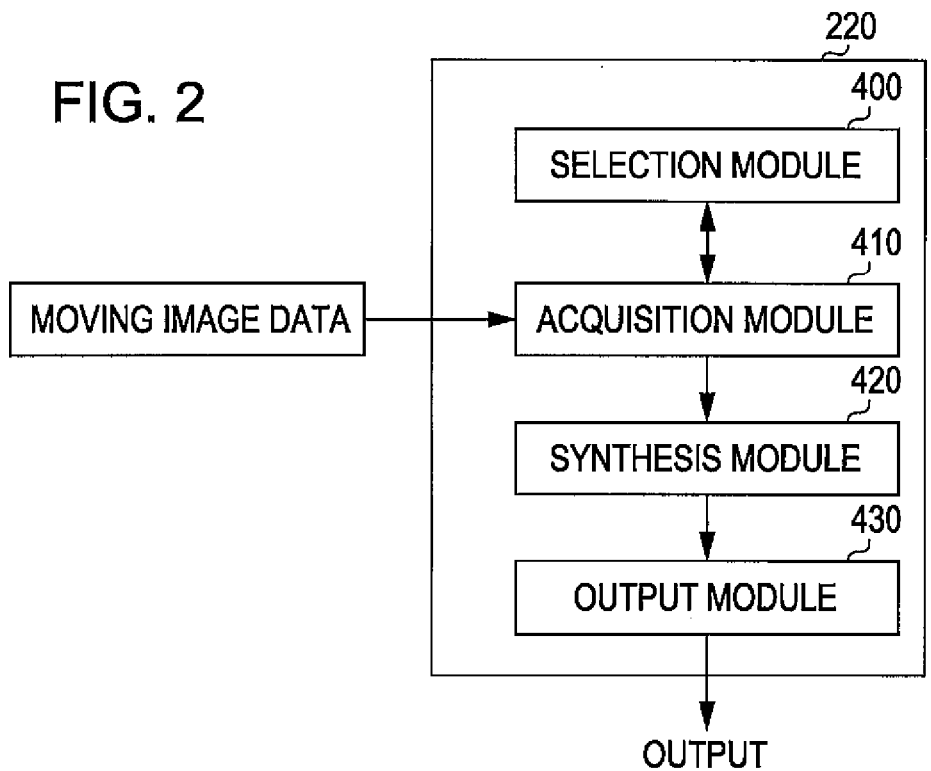
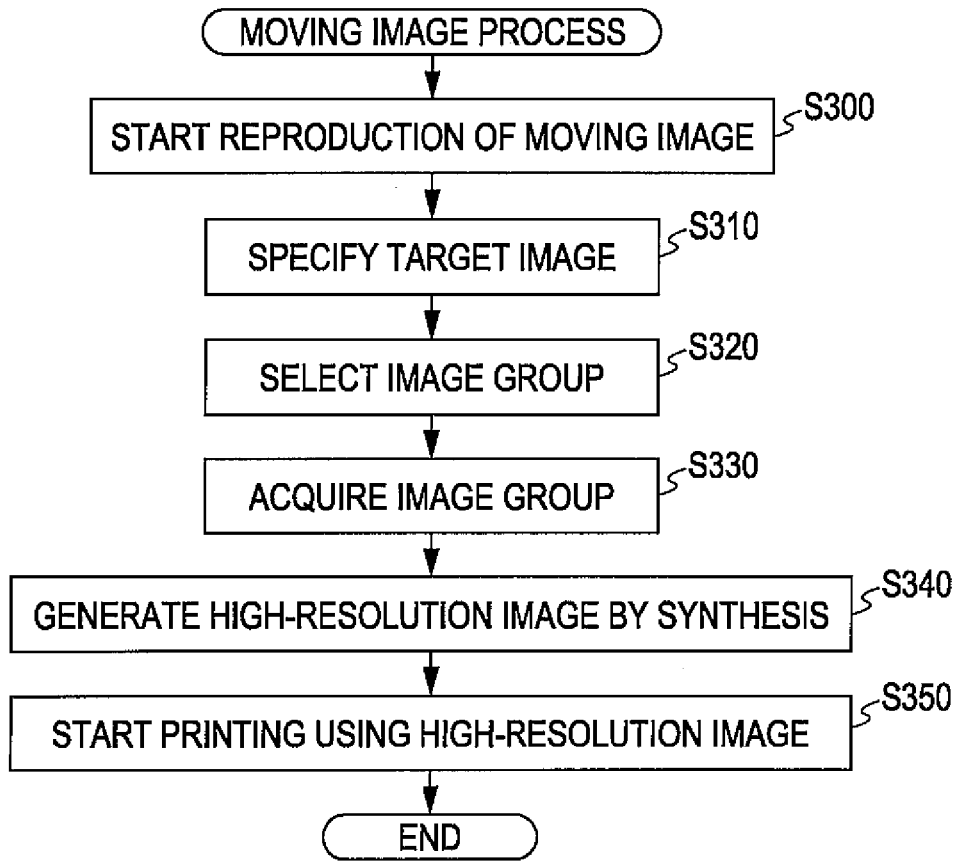

DEVICE, METHOD AND PROGRAM FOR PROCESSING IMAGE

BACKGROUND

1. Technical Field

The present invention relates to a device, method and program for processing an image.

2. Related Art

A moving image includes a plurality of still images which are arranged in a time-series order. By extracting the still images, a still image representing one shot of the moving image can be generated. Here, a technology of synthesizing the plurality of still images to overlap each other to generate a high-resolution image with a pixel density higher than the original still images (JP-A-2000-244851)

However, a process of acquiring the plurality of still images used for synthesis from the moving image was complicated. For example, in order to generate the high-resolution image representing any still image (also called a target image), a technology of synthesizing previous and next still images of the target image in addition to the target image is known. Here, in order to acquire a still image before the target image (also called a before image) the previous image may be acquired by tracing back a sequence of data from the target image in moving image data. The format of the moving image may be set without considering that the still image is acquired by tracing back the sequence of data. Accordingly, after the sequence of data in the moving image is significantly traced back, a complicated process of reading data from the moving image until the previous image is obtained has been used. In a moving image having an MPEG format, some of still images may be represented by encoding using a difference between that image and another reference image. In this case, since the reference image is required for acquiring previous image, a process of acquiring the plurality of still images used for synthesis from the image further become complicated.

SUMMARY

An advantage of some aspects of the invention is that it provides a technology of simplifying a process of acquiring a plurality of still images used for synthesis from a moving image.

According to an aspect of the invention, there is provided a device for processing a moving image, the device including: a selection unit which selects an image group composed of a plurality of still images including a target image from the moving image, according to specified information for specifying the target image among the plurality of still images included in the moving image; an acquisition unit which performs an acquisition process of acquiring the plurality of still images included in the image group from the moving image; and a synthesis unit which performs a synthesis process of synthesizing the plurality of acquired still images and generating a high-resolution image of the target image having a pixel density higher than that of the target image, wherein the selection unit has a function for performing selection by a first mode for selecting the target image and a still image which is located behind the target image in time-series order.

According to the device for processing the image, since the target image and the still image which is located behind the target image in the time-series order are selected as the plurality of still images used for synthesis, it is possible to simplify the process of acquiring the plurality of still images used for the synthesis from the moving image.

In the device the selection unit may have a function for performing selection by a second mode for selecting the target image, a still image which is located ahead of the target image in the time-series order, and a still image which is located behind the target image in the time-series order, when the plurality of still images in the same moving image are specified as the target image by the specified information, the selection unit may select the image group in each of the target images, the acquisition unit and the synthesis unit may perform a series of processes including the acquisition process and the synthesis process in given order in each of the image groups, and the selection unit may perform the selection by the first mode in order to select an image which is first acquired, and performs the selection by the second mode in order to select another image group.

By this configuration, since the image group which is first acquired is selected in the first mode, it is possible to suppress a time necessary for providing a first high-resolution image from being excessively increased.

The invention may be realized in various forms such as an image processing method and device, a computer program for realizing the function of the method or device, a recording medium having the computer program recorded thereon, and a data signal which includes the computer program and is implemented in a carrier.

BRIEF DESCRIPTION OF THE DRAWINGS

The invention will be described with reference to the accompanying drawings, wherein like numbers reference like elements.

FIG. 2 is a view showing a module stored in a ROM 220 (FIG. 1).

FIG. 3 is a flowchart showing a method of processing a moving image.

DESCRIPTION OF EXEMPLARY EMBODIMENTS

Next, embodiments of the invention will be described in the following sequence.

A. First Embodiment
B. Second Embodiment
C. Modified Example

A. FIRST EMBODIMENT

Figure 1A:
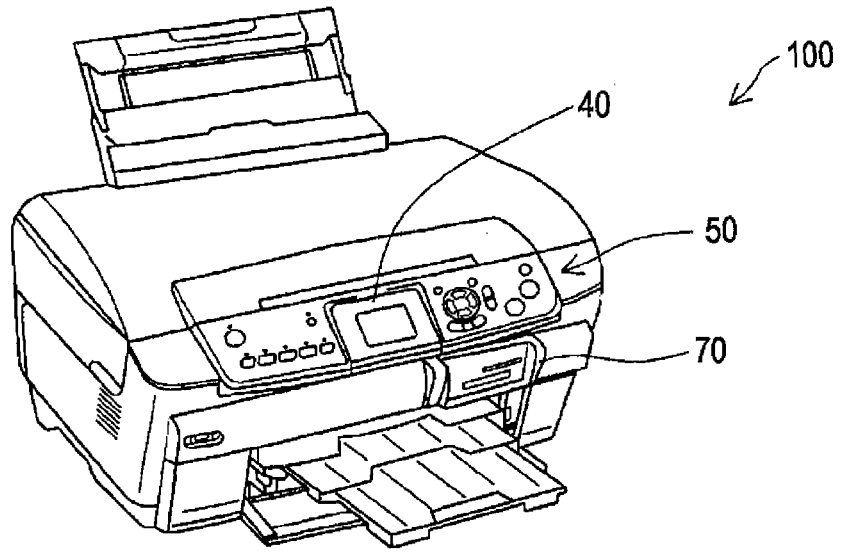
FIG. 1A shows an appearance of a printer according to an embodiment of the invention.
Figure 1B:
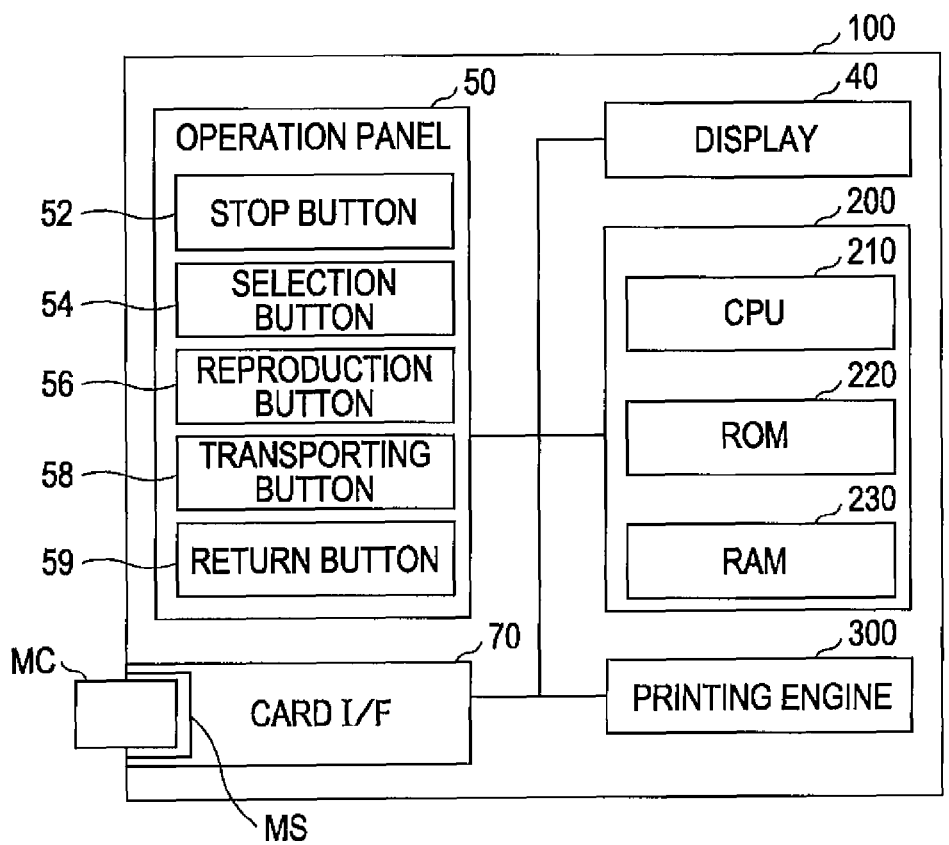
FIG. 1B is a schematic showing of the configuration of the printer.

FIG. 1A shows an appearance of a printer according to an embodiment of the invention and FIG. 1B is a schematic showing of the configuration of the printer. FIG. 1A shows an appearance of the printer 100 and FIG. 1B schematically shows the configuration of the printer 100. As shown in FIG. 1A, the printer 100 includes a display 40, an operation panel 50, and a memory card interface 70. As shown in FIG. 1B, the printer 100 further includes a control unit 200 and a printing engine 300.

The control unit 200 is a computer including a central processing unit (CPU) 210, a ROM 220 and a RAM 230. The control unit 200 controls the components of the printer 100. The printing engine 300 is a printing mechanism for performing printing according to given printing data. As the printing mechanism, various printing mechanisms such as a printing mechanism for discharging ink droplets onto a printing medium so as to form an image or a printing mechanism for transferring and fixing a toner onto a printing medium so as to form an image may be employed. The display 40 displays a variety of information including an image. As the display 40, various displays such as a liquid crystal display or an organic electroluminescence display may be employed. The operation panel 50 includes a plurality of buttons such as a stop button 52, a selection button 54, a reproduction button 56, a transporting button 58 and a return button 59. When any one button is pressed, a signal indicating that the button is pressed is supplied to the control unit 200. The operation panel 50 functions as an input unit which receives a command of a user. The input unit is not limited to the operation panel 50 and various input devices which receive the command of the user, such as a touch panel, may be employed. A memory card interface 70 includes a slot MS into which a memory card MC is inserted. Data stored in the memory card MC is read by the control unit 200 through the memory card interface 70.

FIG. 2 is a view showing a module stored in the ROM 220 (FIG. 1). In the first embodiment, a selection module 400, an acquisition module 410, a synthesis module 420 and an output module 430 are stored in the ROM 220. These modules are programs executed by the CPU 210. The modules can exchange a variety of data through the RAM 230 (FIG. 1B).

FIG. 3 is a flowchart showing a method of processing a moving image. The moving image process is executed by the control unit 200 (FIG. 1). In the moving image process, a target image is specified by the user from a plurality of still images included in the moving image and is printed. The control unit 200 automatically starts the moving image process when the memory card MC for storing moving image data is inserted into the slot MS (FIG. 1). Alternatively, the control unit 200 may start the moving image process according to the command of the user.

In a step S300, the acquisition module 410 (FIG. 2) acquires the moving image data from the memory card MC and starts reproduction of the moving image. Examples of the format of the moving image data may include various formats such as a moving picture experts group MPEG format or a Motion JPEG format. Examples of a scanning method may include a progressive method and an interlace method. In the first embodiment, the format of the moving image data is the MPEG format of the progressive scan method. The moving image data includes a plurality of pictures. The pictures may include an I-picture, a P-picture, and a B-picture.

Figure 4:
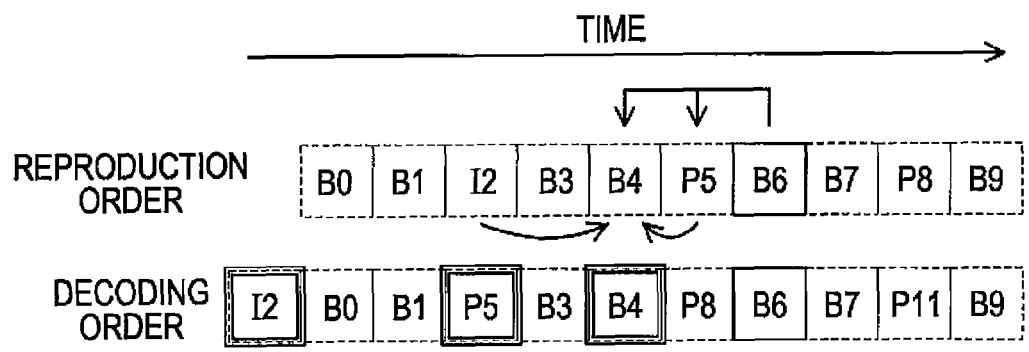
FIG. 4 is a view showing a picture.

FIG. 4 is a view showing a picture. In FIG. 4, the plurality of pictures included in the moving image data are represented by rectangles attached with reference numerals. Alphabets (I, P and B) of the reference numerals represent the types of the pictures and the numerals of the reference numerals represent reproduction order. The I-picture is data using non-predictive encoding, the P-picture is data using forward predictive encoding, and the B-picture is data using bidirectional predictive encoding. In the present embodiment, the pictures represent one frame of an image (still image) at any time point.

The "decoding order" of the drawing represents the decoding order when the moving image is reproduced. A plurality of pictures is stored in the moving image data in the decoding order. In a case where the moving image data includes the B-picture, the decoding order may be different from the reproduction order (time-series order). This is because the P-picture or the I-picture which should be reproduced later than the B-picture is used for the decoding of the B-picture.

The acquisition module 410 acquires still image data (frame image data) representing a plurality of still images arranged in the time-series order and displays the still images (frame images) represented by the acquired still image data on the display 40. The acquisition module 410 reproduces the moving image by switching the displayed frame image in the time-series order.

In a step S310 of FIG. 3, a target image is specified by the user. In the first embodiment, the frame image which is displayed at a time point when the selection button 54 (FIG. 1B) is pressed is used as the target image. The user views the moving image displayed on the display 40 and presses the selection button 54 at a time point when a desired shot is displayed. The signal indicating that the selection button 54 is pressed is supplied from the operation panel 50 to the control unit 200. Hereinafter, this signal is also called a "specified signal".

The selection module 400 (FIG. 2) recognizes that the frame image displayed at that time point is specified as the target image when receiving the specified signal. That is, in the first embodiment, the specified signal corresponds to "specified information" in claims. The acquisition module 410 stops the reproduction of the moving image when receiving the specified signal.

Figure 5:
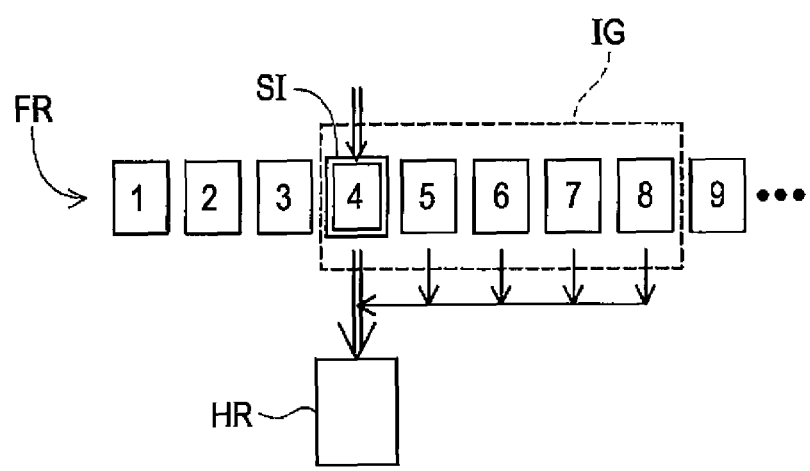
FIG. 5 is a view showing an image group.

In a step S320, the selection module 400 (FIG. 2) selects an image group when receiving the specified signal. FIG. 5 is a view sowing the image group. In the drawing, a plurality of frame images FR included in the moving image are represented by rectangles. The numerals described in the rectangles represent the time-series order (hereinafter, this order is also called a "frame number"). The frame image attached with a reference character SI represents the target image. The group IG of frame images represents an image group selected by the specified signal. The image group IG is composed of five frame images including the target image SI. In particular, the image group IG includes the target image SI and the frame images next to the target image SI in the time-series order (reproduction order) (hereinafter, also called "next frames"). The reason why the frame images next to the target image SI are selected will be described later.

In a step S330 of FIG. 3, the acquisition module 410 acquires the still images included in the image group IC (acquires the still image data representing the still image). As shown in FIG. 5, the image group IC is composed of the target image SI and the next frames. Accordingly, the acquisition module 410 can acquire all the still images (frame images) of the image group IC by decoding the pictures in a predetermined decoding order after acquiring the target image, similar to the reproduction of the moving image.

Here, it is assumed that the frame images previous to the target image SI (hereinafter, also called "previous frames") are included in the image group IC in the time-series order (reproduction order). For example, in FIG. 4, it is assumed that a B6 picture is specified as the target image and an immediately previous P5 picture and a B4 picture, which is two pictures ahead, are included in the image group. Here, an I2 picture and a P5 picture are required for the decoding of the B4 picture. Accordingly, the three pictures B4, P5 and I2 are used for acquiring two previous (P5, B4). The decoding order of the three pictures B4, P5 and I2 are respectively a picture, which is four pictures ahead, a picture, which is two pictures ahead, and a picture, which is seven pictures ahead, of the target image (B6). The size (decoding order) of the data traced back from the target image may be significantly changed by the frame (picture) to be acquired. The size of the data traced back from the target image may be also significantly changed by the used moving image data. The decoding order of the previous frame may be next to the decoding order of the target image in any selected previous frame. Accordingly, in order to acquire the previous frame, a process of acquiring the previous frame by significantly tracing back the sequence of data in the moving image data and reading data in order of the sequence of data is performed.

In a case where the previous frame is included in the image group IG, the process of acquiring the frame image for synthesis may be complicated. However, in the first embodiment, the previous frame is not included in the image group IC. As a result, the process of acquiring the plurality of frame images included in the image group IC can be simplified.

Figure 6:
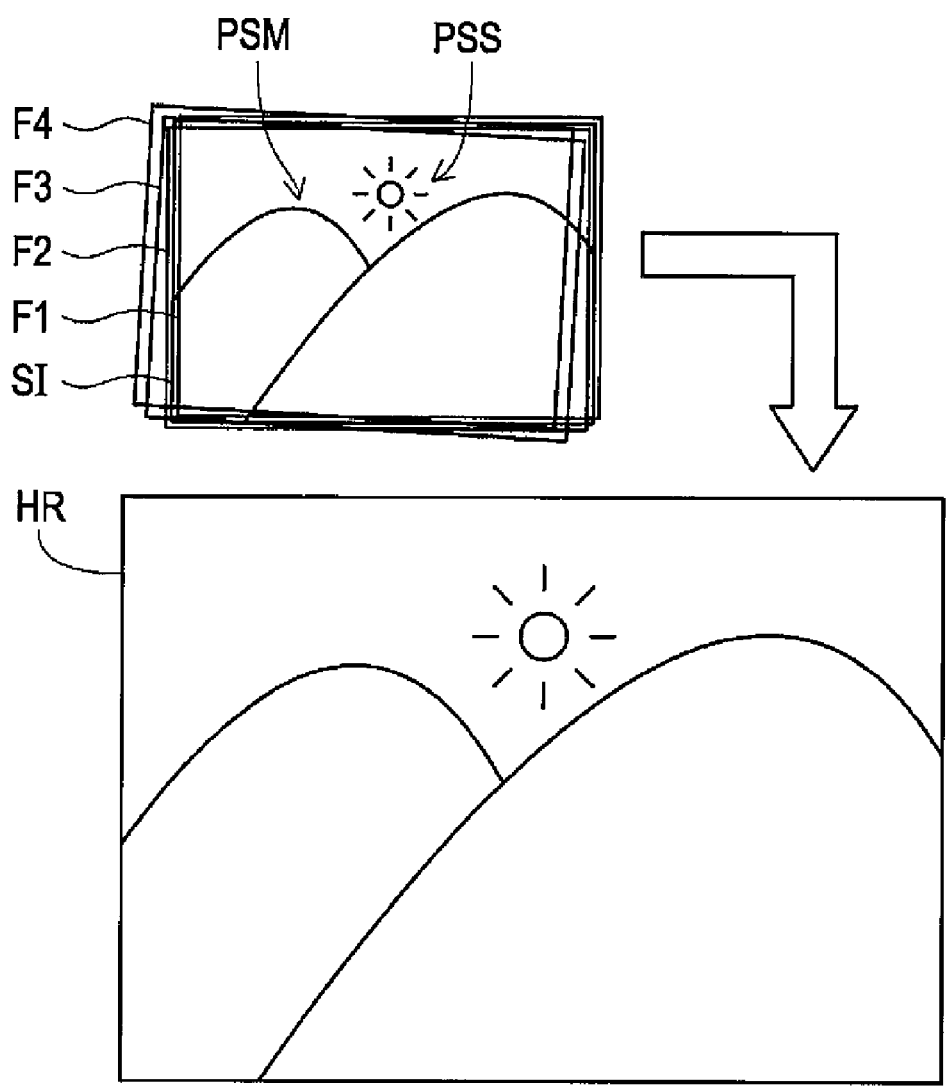
FIG. 6 is a view showing an example of image synthesis.

In a step S340 of FIG. 3, the synthesis module 420 synthesizes the plurality of frame images included in the image group IC and generates the high-resolution still image of the target image SI (synthesizes the plurality of frame image data and generates the high-resolution still image data). The high-resolution still image and the target image SI represent the same image. The pixel density of the high-resolution still image is higher than that of the target image SI. FIG. 6 is a view showing an example of image synthesis. In the drawing, the target image SI and four frame images F1 to F4 are shown (all these images are included in the image group IG).

The synthesis module 420 first determines positions of the frame images F1 to F4 relative to the target image SI. In FIG. 6, a state in which the four frame images F1 to F4 overlap the target image SI is shown. The frame images F1 to F4 are arranged relative to the target image SI. The relative positions are determined such that subjects overlap each other. In the example shown in FIG. 6, the relative positions are determined such that the suns PSS and the mountains PSM overlap each other. The synthesis module 420 can determine the relative positions using various known methods such as image pattern matching, feature point tracking and a gradient method. For example, the synthesis module 420 extracts feature points such as end points or branching points of lines (for example, contours) representing the subject from two images to be overlapped and determines the relative positions such that the obtained features overlap each other. The synthesis module 420 may determine the relative positions with precision corresponding to the size of one pixel or less by the above-described various methods. In addition, the relative positions may be represented by a combination of a shift amount in a translational direction and a shift amount in a rotational direction.

Next, the synthesis module 420 determines a pixel value of a high-resolution image HR by using the five images SI and F1 to F4 included in the image group 1G. In the first embodiment, the high-resolution image HR represents the same image as the target image SI. The pixel density of the high-resolution image HR is higher than of the target image SI. The pixel density of the high-resolution image HR may be specified by the user or may be previously set. In either case, the positions of the plurality of pixels included in the high-resolution image HR are determined according to the pixel density.

The synthesis module 420 determines the pixel value of the high-resolution image HR using the pixel values of the target image SI and the frame images F1 to F4 after movement based on the relative positions. As the method of determining the pixel value, various methods may be employed. For example, a pixel value of any pixel (hereinafter, also called a "generated pixel") of the high-resolution image HR may be determined by the following method. That is, the pixel value of the generated pixel may be determined by interpolating the pixel values of a predetermined number (for example, 4) of pixels closest to the generated pixel of the plurality of pixels of the five overlapped images S1 and F1 to F4. At this time, it is preferable that the weights according to a distance between the pixels used in the interpolation and the generated pixel are used (the weight is decreased as the distance is increased). The pixel value of the generated pixel may be determined by selecting one frame image from the five overlapped frame images S1 and F1 to F4 in each generated pixel and applying an interpolation method (for example, a bi-linear method or a bi-cubic method) to the selected frame image. At this time, a frame image having a pixel closest to the generated pixel is selected.

In a step S350 of FIG. 3, the output module 430 starts the printing using the high-resolution image HR. The output module 430 generates printing data using the high-resolution image HR and supplies the generated printing data to the printing engine 300. The printing engine 300 performs the printing using the received printing data. When the printing is completed, the moving image process shown in FIG. 3 is completed.

As described above, in the first embodiment, the target image SI and the frame images next to the target image SI in the time-series order are selected as the plurality of still images used for synthesis of the high-resolution image. As a result, the process of acquiring the plurality of still images used for synthesis from the moving image can be simplified.

The processes of the steps S310 to S350 are repeated with respect to the same moving image data. That is, whenever the selection button 54 is pressed while the moving image is reproduced, the frame image which is displayed at that time point may be printed. In this case, the acquiring module 410 may continuously reproduce the moving image even when the specified signal is received.

In the first embodiment, the buttons 52 and 56 to 59 excluding the selection button 54 are not used (FIG. 1B). Accordingly, the buttons 52 and 56 to 59 may be omitted.

B. SECOND EMBODIMENT

Figure 7:
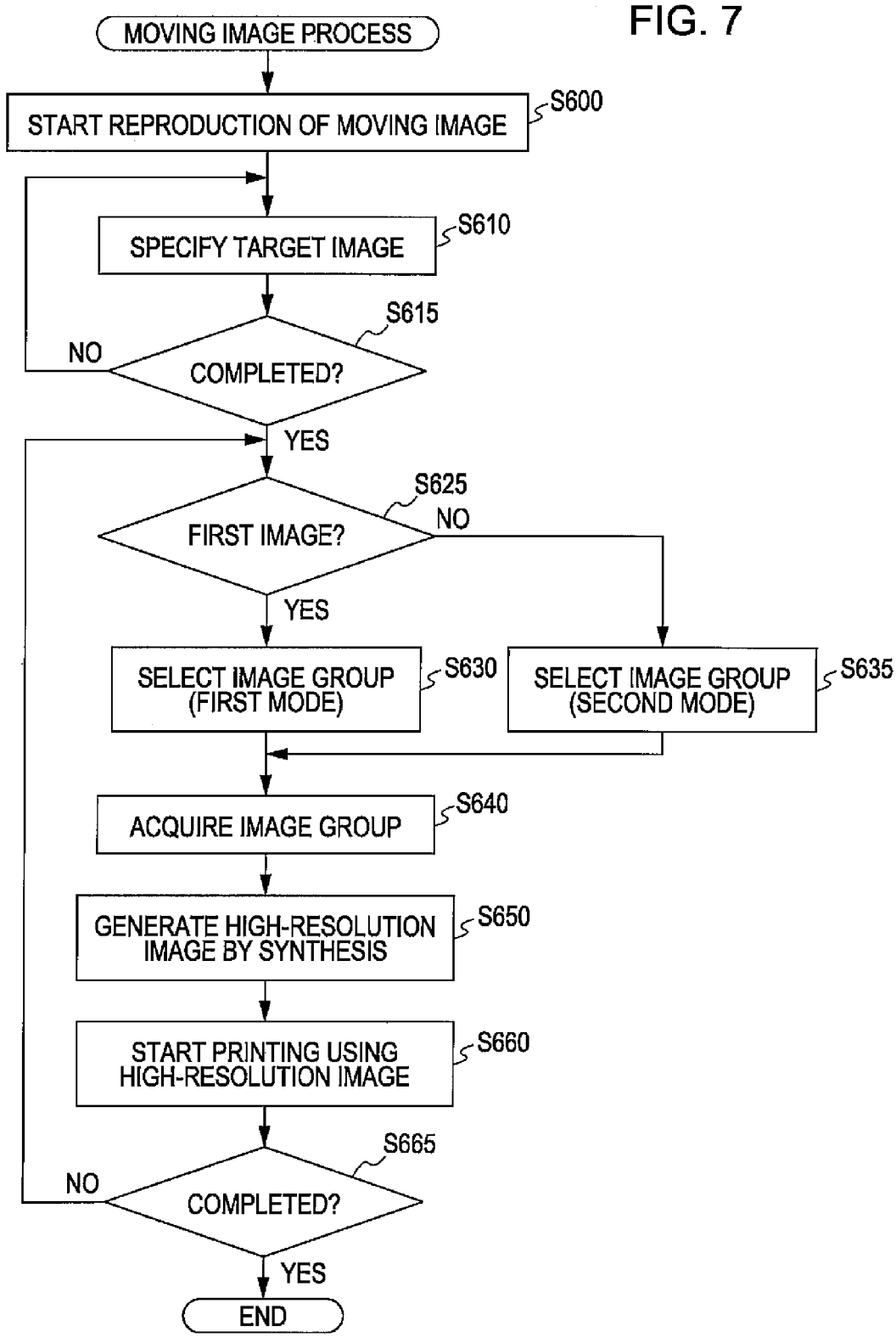
FIG. 7 is a flowchart showing another method of processing a moving image.

FIG. 7 is a flowchart showing another method of processing a moving image. The method is different from the method shown in FIG. 3 in that the selection module 400 has a first mode and a second mode as a selection mode of an image group (which will be described in detail later). The configuration of the device is equal to that of the first embodiment shown in FIGS. 1 and 2.

Steps S600 and S610 are equal to the steps S300 and S310 shown in FIG. 3. However, in the second embodiment, the step S610 may be repeated several times. As a result, in the same moving image, a plurality of target images may be specified by the user. In the second embodiment, in order to specify the target image, the user may use the stop button 52, the reproduction button 56, the transporting button 58, and the return button 59 in addition to the selection button 54 (FIG. 1). The acquisition module 410 performs the following process according to the pressing of these buttons: (1) stop button 52: stop the reproduction of the moving image (stop the updating of the displayed frame image), (2) reproduction button 56: resume the reproduction of the moving image (resume the updating of the displayed frame image), (3) transporting button 58: transport the frame of the displayed frame image, and (4) return button 59: return the frame of the displayed frame image.

The user may display a desired frame image by selectively pressing these buttons. The target image may be specified by pressing the selection button 54 in a state in which the desired frame image is displayed. The selection module 400 recognizes that the frame image displayed at that time point is specified as the target image, when the selection button 54 is pressed.

In a step S615, the selection module 400 determines whether the specifying of the target image is completed. As the completion condition, any condition may be employed. For example, a condition that the moving image is reproduced to the end may be employed. Alternatively, a condition that a completion button (not shown) of the operation panel 50 is pressed may be employed. If the specifying the target image is not completed, the step S610 is repeated.

Figure 8:
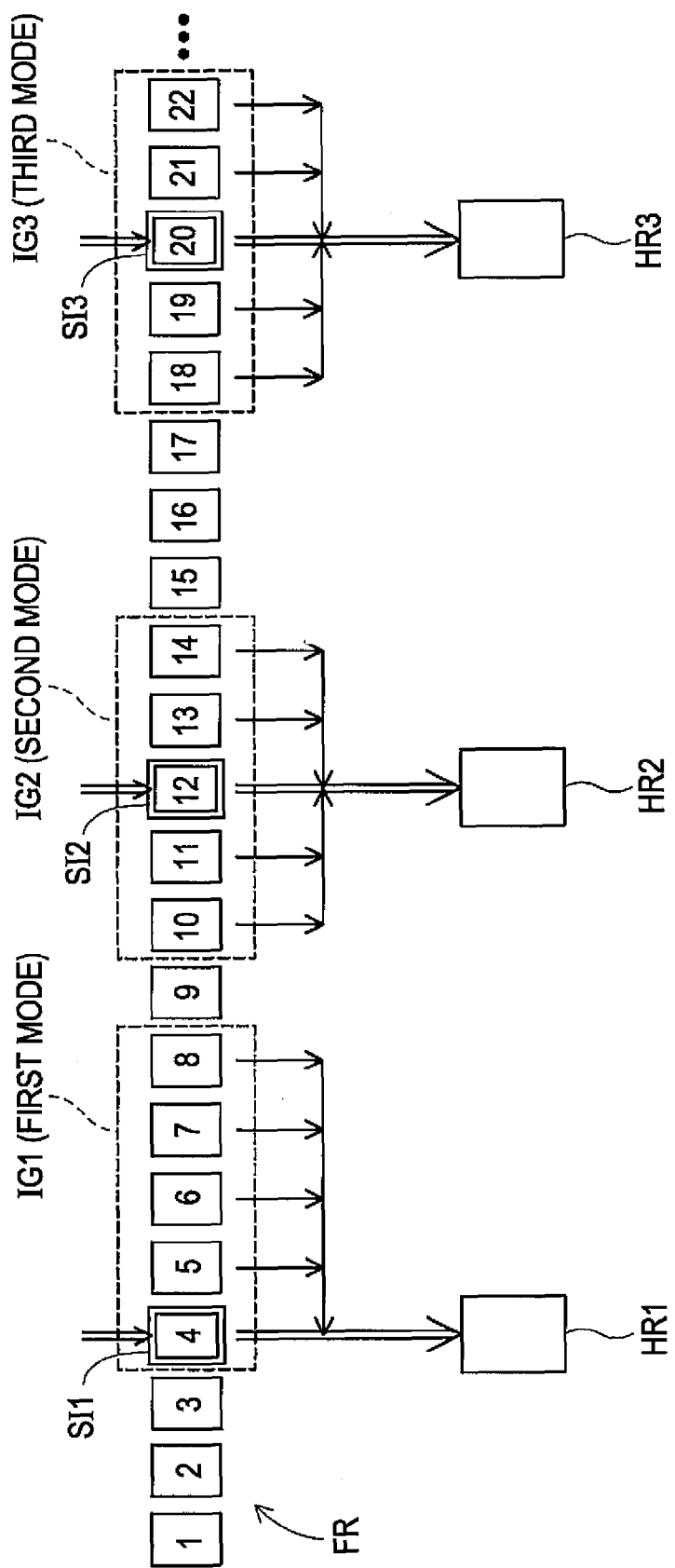
FIG. 8 is a view showing an example of a target image.

FIG. 8 is a view showing an example of a target image. In FIG. 8, similar to FIG. 5, a plurality of frame images FR included in the moving image is shown. In the drawing, three images SI1, SI2 and SI3 represent target images. If the step S610 of FIG. 7 is repeated, the selection module 400 receives the specified signals (the signals indicating that the selection button 54 are pressed) several times. The three images SI1, SI2 and SI3 represent the frame images specified by the plurality (three, in this case) of specified signals, respectively. In the second embodiment, all the plurality of specified signals correspond to "specified information" in claims.

After the specifying the target images are completed, the processes of steps S625 to 660 of FIG. 7 are performed. In the steps S625 to 660, a series of processes including the acquisition of an image group and image synthesis is performed with respect to one target image. If the plurality of target images is selected, the series of processes is repeated with respect to each target image. In the second embodiment, the target images are processed in time-series order. For example, in the example shown in FIG. 8, the processes of the steps S625 to 660 are repeated in order of the first target image SI1, the second target image SI2 and the third target image SI3.

In the step S625, the selection module 400 determines whether or not the current target image is an image, which is first processed, among the plurality of target images. According to the determined result, the selection module 400 switches the selection mode of the image group. The selection of the first mode is equal to the selection of the first embodiment, and a target image and a still image which is next to the target image in the time-series order are selected. The second mode is a mode for selecting a target image, a still image which is previous to the target image in the time-series order, and a still image which is next to the target in the time-series order.

First, a case of processing the first target image will be described. In this case, in the step S630, the selection module 400 performs the selection by the first mode. The selection of the step S630 is equal to the selection of the step S320 of FIG. 3. The selection module 400 selects the target image and the next frames as the image group. For example, in the example of FIG. 8, among the plurality of target images SI1, SI2 and SI3, the first target image SI1 is first processed. If the first target image SI1 is processed, the selection module 400 the first target image SI1 and four frame images next to the first target image SI1 as the image group IG1 for the first target image SI1.

The subsequent steps S640, S650 and S660 are performed similar to the steps S330, S340 and S350 of FIG. 3. In the step S640, the acquisition module 410 acquires all still images (frame images) included in the image group from the moving image. At this time, the acquisition module 410 acquires the image group by reading data from the moving image data in order of the sequence of data. At this time, the data may be read while skipping necessary data.

In the selection of the first mode, the target image and the next frames are selected. Accordingly, the acquisition module 410 may rapidly acquire all the frame images by acquiring the target image and decoding the pictures in a predetermined decoding order similar to the reproduction of the moving image.

Information for identifying the still images included in the image group is supplied from the selection module 400 to the acquisition module 410. As such information, any information for identifying the target image may be employed. For example, a frame number (time-series order) may be employed. Reproduction times (times in which the frame images should be displayed and relative times to the first frame image) corresponding to the frame images may be employed.

In the step S650, the synthesis module 420 synthesizes the acquired frame images and generates a high-resolution image representing the same image as the target image. In the step S660, the output module 430 starts the printing using the high-resolution image.

In a step S665, the selection module 400 determines whether the processes of all the target images are completed. If the processes are completed, the control unit 200 completes the moving image process. If the target image which is not processed remains, the selection module 400 returns to the step S625, which starts the process for the next target image. The process for the next target image is started without waiting for the completion of the printing.

Next, a case of processing the second target image and the subsequent target image will be described. In the step S625, the selection module 400 determines that the current target image is not the first target image. In this case, in a step S635, the selection module 400 performs the selection by the second mode. In the second mode, the target image, the previous frame and the next frame are selected. For example, in the example shown in FIG. 8, a case of processing the second target image SI2 will be described. In this case, the selection module 400 selects the second target image SI2, two frame images previous to the second target image SI2 and two frame images next to the second target image SI2 as an image group IG2 for the second target image SI2. Even with respect to an image group IG3 for the third target image SI3, the same selection is performed.

In a step S640, the acquisition module 410 acquires all still images (frame images) included in the image group from the moving image. The acquisition module 410 can acquire at least a portion of the still images of the image group by reading data from the moving image data in order of the sequence of data, after the step S640. At this time, the data may be read while skipping unnecessary data.

In a case of the second target image and the subsequent target image are processed, the previous frames are included in the image group. In this case, as the process of acquiring the still images, various processes may be employed. For example, the acquisition module 410 can acquires the previous frames by acquiring the target image from the moving image data and tracing back the sequence of data from the target image. In either case, the process of acquiring the still images becomes more complicated compared with the case where the image group is selected in the first mode.

As the size of the traced-back data, a predetermined value may be employed. For example, a value, which is experimentally determined without erroneously taking the previous frames, is employed with respect to a variety of moving image data. A variable may be employed, instead of the predetermined value. For example, the process of tracing back the sequence of data and reading the data in order of the sequence of data may be repeated while increasing the size of the traced-back data. Here, the repetition is performed until the acquisition of all the frame images of the image group is completed.

The subsequent steps S650 and 660 are performed similar to the case where the first target image is processed. The processes of the steps S625 to S660 are repeated until the process of all the target images are completed. Accordingly, the high-resolution image is generated with respect to all the target images. All the target images are printed. For example, in the example of FIG. 8, three high-resolution images HR1, HR2 and HR3 corresponding to the three target images SI1, SI2 and SI3 are generated.

As described above, in the second embodiment, the image group which is first acquired is selected in the first mode. As a result, since the previous frame is not included in the first image group, it is possible to suppress a time necessary acquiring the first image group from being excessively increased. The synthesis process of the first high-resolution image can be rapidly started. Accordingly, it is possible to suppress a necessary time until the first high-resolution image is supplied from being excessively increased.

In the second embodiment, in order to select another image group (an image group acquired after the first image group), the selection by the second mode is made. Accordingly, both the previous frame and the next frame are selected. As a result, compared with the case the selection by the first mode is made, the number of frame images closest to the target image in view of the time can be increased. That is, the number of tile frame images similar to the target image can be increased in the image group. As a result, it is possible to generate the high-quality high-resolution image.

In addition, in a case where the selection of the image group by the first mode is used, when the synthesis is performed such that the frame image having a middle time-series order in the image group represents a high-resolution image, the number of frame images similar to the high-resolution image can be increased in the image group. For example, in the example of FIG. 8, the high-resolution image HR1 is not the target image SI1 and represents a sixth frame image. In this case, a probability that the high-resolution image represents an image different from the specified target image is increased. Accordingly, it is preferable that the synthesis is performed such that the high-resolution image represents the same image as the target image.

In the second embodiment, the process of the next target image is started without waiting for the completion of the printing of the previous target image. Accordingly, while the printing of the previous target image is performed, the process of the next target image can be performed. As a result, it is possible to suppress a time necessary for the process of generating a plurality of high-resolution image from being excessively increased.

C. MODIFIED EXAMPLE

Among the components in the embodiments, the elements excluding the elements which are described in independent claims are additional elements and thus can be properly omitted. The invention is not limited to the above-described embodiments and may be modified without departing from the scope of the invention. For example, the following modifications are possible.

Modified Example 1

The moving image process is not limited to the processes shown in FIGS. 3 and 7 and various processes may be employed. For example, in the method of FIG. 7, the processes of selecting the image group (steps S625 to S635) may be performed between the step S610 and the step S615. In the method of FIG. 7, the steps S625 and S635 may be omitted. That is, when the plurality of target images are specified, all the image groups may be selected in the first mode.

Modified Example 2

The method of synthesizing the plurality of still images and generating the high-resolution image is not limited to the methods of the above-described embodiments and any method of generating a high-resolution image of a target image having a pixel density higher than that of an original still image may be employed. For example, a target image may be divided into a plurality of blocks and a relative position for overlapping a plurality of still images may be determined in each block. The total number of still images used for synthesis is not limited to five and any number of still images may be employed.

Modified Example 3

In the above-described embodiments, the method of selecting the image group in the first mode and the second is not limited to the methods of the above-described embodiments and various methods may be employed. For example, the selection module 400 may select still images with similarity higher than a threshold in relation to the target image as the image group, while excluding still images with the similarity equal to or lower than the threshold in relation to the target image from the image group, in the selection by the first mode. In this case, since the still images which are not similar to the target image are suppressed from being used for synthesis, it is possible to image quality of the generated high-resolution image. As a method of calculating the similarity between two images, any method may be employed. For example, brightness histograms of the two images may be prepared and a sum of differences between frequencies of ranks may be used as the similarity (in this case, as the sum is decreased, the similarity is increased). The similarity may be calculated by pattern matching using feature points in the images. In a case where the still images with low similarity are excluded, other still images may be added in order to maintain the total number of images used for synthesis or the total number of the images may be reduced without adding other still images. These aspects are applicable to the selection by the second mode.

Modified Example 4

In the above-described embodiments, the use of the high-resolution image is not limited to the printing and various uses may be employed. For example, in the step S350 of FIG. 3 and the step S660 of FIG. 7, the output module 430 (FIG. 2) may provide the high-resolution still image data to the user, instead of performing the printing. The image processing device using the moving image process of generating the high-resolution image is not limited to the printer 100 and any device may be employed. For example, various devices such as a digital camera, a mobile telephone, and a personal digital assistant may be employed.

Modified Example 5

In the above-described embodiments, the specified information is not limited to the signal indicating that the selection button 54 is pressed and any information for specifying the target image may be employed. For example, a target image selection module (not shown) for selecting a target image automatically or according to the command of the user may be installed in the ROM 220 of FIG. 2. Information which is supplied by the target image selection module and specifies the target image may be used as the specified information. Here, the target image selection module may select the target image by any method. For example, a predetermined number (for example, 12) of target images may be equally selected from a specified period, according to the command of the user for specifying any period of a moving image. The target image may be automatically selected without using the information input by the user. For example, a predetermined number (for example, 12) of target images may be equally selected from the whole period of the moving image.

Modified Example 6

In the above-described embodiments, the format of the moving image data is not limited to the MPEG format and any format may be employed. Although, in the above-described embodiments, the moving image data of the progressive scan is used, moving image data of the interlace scan may be used. In this case, a field image may be employed as the still image, instead of the frame image. Instead of employing the field image without alteration, one frame image prepared from two field images may be employed. The reconfiguration of the frame image from the field images may be performed by the acquisition module 410.

Modified Example 7

In the above-described embodiments, the order of the series of processes including the acquisition of the image group when the plurality of target images are specified and the synthesis of the high-resolution images is equal to the time-series order of the target images corresponding to the image groups, any order may be employed. For example, the order specified by the user may be employed.

Modified Example 8

In the above-described embodiment, a portion of the configuration realized by hardware may be replaced with software and a portion of the configuration realized by software may be replaced with hardware. For example, the function of the acquisition module 410 of FIG. 2 may be realized by a hardware circuit having a logic circuit.

In a case where a portion or all of the functions of the invention is realized by software, the software (computer program) may be provided in a state of being stored in a computer-readable recording medium. In the invention, the "computer-readable recording medium" is not limited to a mobile recording medium such as a flexible disc or a CD-ROM and includes an internal storage device in a computer, such as a RAN or a ROM, and an external storage device installed in the computer, such as a hard disc.

What is claimed is:

1. A device for processing a moving image, the device comprising:
   a selection unit which selects an image group composed of a plurality of still images including a target image from the moving image, according to specified information for specifying the target image among the plurality of still images included in the moving image;
   an acquisition unit which performs an acquisition process of acquiring the plurality of still images included in the image group from the moving image; and
   a synthesis unit which performs a synthesis process of synthesizing the plurality of acquired still images and generating a high-resolution image of the target image having a pixel density higher than that of the target image,
   wherein the selection unit has a function for performing selection by a first mode for selecting the target image and a still image which is located behind the target image in time-series order.

2. The device according to claim 1, wherein:
   the selection unit has a function for performing selection by a second mode for selecting the target image, a still image which is located ahead of the target image in the time-series order, and a still image which is located behind the target image in the time-series order,
   when the plurality of still images in the same moving image are specified as the target image by the specified information,
   the selection unit selects the image group in each of the target images,
   the acquisition unit and the synthesis unit perform a series of processes including the acquisition process and the synthesis process in given order in each of the image groups, and
   the selection unit performs the selection by the first mode in order to select an image which is first acquired, and performs the selection by the second mode in order to select another image group.

3. A method for processing a moving image, the method comprising:
   selecting an image group composed of a plurality of still images including a target image from the moving image, according to specified information for specifying the target image among the plurality of still images included in the moving image;
   performing an acquisition process of acquiring the plurality of still images included in the image group from the moving image; and
   performing a synthesis process of synthesizing the plurality of acquired still images and generating a high-resolution image of the target image having a pixel density higher than that of the target image,
   wherein the selecting the image group includes a process of performing selection by a first mode for selecting the target image and a still image which is located behind the target image in time-series order.

4. A computer program embodied on a non-transitory computer readable medium for processing a moving image, the computer program comprising:
   a selection function which selects an image group composed of a plurality of still images including a target image from the moving image, according to specified information for specifying the target image among the plurality of still images included in the moving image;
   a function which performs an acquisition process of acquiring the plurality of still images included in the image group from the moving image; and
   a function which performs a synthesis process of synthesizing the plurality of acquired still images and generating a high-resolution image of the target image having a pixel density higher than that of the target image,
   wherein the selection function includes a function for performing selection by a first mode for selecting the target image and a still image which is located behind the target image in time-series order.

* * * * *